US011203934B2

(12) United States Patent
Kray et al.

(10) Patent No.: US 11,203,934 B2
(45) Date of Patent: Dec. 21, 2021

(54) GAS TURBINE ENGINE WITH SEPARABLE SHAFT AND SEAL ASSEMBLY (71) Applicant: General Electric Company, Schenectady, NY (US)

(72) Inventors: Nicholas Joseph Kray, Mason, OH (US); Steven Mark Ballman, West Chester, OH (US)

(73) Assignee: General Electric Company, Schenectady, NY (US)

( * ) Notice: Subject to any disclaimer, the term of this patent is extended or adjusted under 35 U.S.C. 154(b) by 91 days.

(21) Appl. No.: 16/526,205

(22) Filed: Jul. 30, 2019

(65) Prior Publication Data
US 2021/0032992 A1 Feb. 4, 2021

(51) Int. Cl.
F01D 5/06 (2006.01)
F01D 5/02 (2006.01)
F01D 11/00 (2006.01)
F04D 29/32 (2006.01)

(52) U.S. Cl.
CPC ............. *F01D 5/066* (2013.01); *F01D 5/026* (2013.01); *F01D 11/001* (2013.01); *F04D 29/321* (2013.01); *F05D 2230/60* (2013.01); *F05D 2240/24* (2013.01); *F05D 2240/55* (2013.01); *F05D 2240/60* (2013.01); *F05D 2260/31* (2013.01)

(58) Field of Classification Search
CPC ........ F01D 5/066; F01D 5/026; F01D 11/001; F04D 29/321; F05D 2230/60; F05D 2240/24; F05D 2240/55; F05D 2240/60; F05D 2260/31
See application file for complete search history.

(56) References Cited

U.S. PATENT DOCUMENTS

| 7,147,436 | B2* | 12/2006 | Suciu | F01D 5/025 |
| | | | | 415/216.1 |
| 8,147,178 | B2 | 4/2012 | Ottaviano et al. | |
| 9,121,280 | B2* | 9/2015 | Benjamin | F01D 5/026 |
| 9,291,070 | B2* | 3/2016 | Fielding | F01D 5/02 |
| 9,410,427 | B2* | 8/2016 | Giannakopoulos | F01D 5/026 |
| 9,410,446 | B2* | 8/2016 | Benjamin | F01D 25/16 |
| 9,816,963 | B2 | 11/2017 | Vetters et al. | |
| 10,119,476 | B2 | 11/2018 | Caprario | |
| 2007/0122265 | A1 | 5/2007 | Ansari et al. | |
| 2013/0195627 | A1 | 8/2013 | Glahn et al. | |
| 2017/0051751 | A1 | 2/2017 | Ackermann et al. | |
| 2017/0107839 | A1 | 4/2017 | Glahn et al. | |
| 2017/0130732 | A1 | 5/2017 | Schwarz et al. | |
| 2018/0328177 | A1 | 11/2018 | Turner et al. | |

FOREIGN PATENT DOCUMENTS

EP 3159480 A1 4/2017

* cited by examiner

Primary Examiner — Jesse S Bogue
(74) Attorney, Agent, or Firm — Dinsmore & Shohl LLP (57) ABSTRACT A gas turbine engine defining a radial direction is provided. The gas turbine engine includes a tie shaft; a compressor section including a last rotor stage, the compressor section assembled to a first portion of the tie shaft; a separable shaft disposed between the compressor section and the tie shaft, the separable shaft having a radial outward portion and a radial inward portion, the radial outward portion of the separable shaft in contact with a portion of the last rotor stage at an interface; and a seal assembly operable with a portion of the separable shaft proximate the radial inward portion.

20 Claims, 3 Drawing Sheets

GAS TURBINE ENGINE WITH SEPARABLE SHAFT AND SEAL ASSEMBLY

FIELD

The present subject matter relates generally to a gas turbine engine, or more particularly to a gas turbine engine having a separable shaft and a seal assembly.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

Some gas turbine engines are assembled with both compressor rotors and turbine rotors coupled to a tie shaft connection. This eliminates the welded or bolted joints between such rotors and includes a single coupling using the tie shaft connection which applies an axial force through the compressor rotor stacks to couple them together. However, such gas turbine engines may exhibit balance issues when there are large variations in rotor thrust balance.

Accordingly, a gas turbine engine having one or more features for reducing rotor thrust variations and providing rotor thrust balance would be useful.

BRIEF DESCRIPTION

Aspects and advantages of the invention will be set forth in part in the following description, or may be obvious from the description, or may be learned through practice of the invention.

In one exemplary embodiment of the present disclosure, a gas turbine engine defining a radial direction is provided. The gas turbine engine includes a tie shaft; a compressor section including a last rotor stage, the compressor section assembled to a first portion of the tie shaft; a separable shaft disposed between the compressor section and the tie shaft, the separable shaft having a radial outward portion and a radial inward portion, the radial outward portion of the separable shaft in contact with a portion of the last rotor stage at an interface; and a seal assembly operable with a portion of the separable shaft proximate the radial inward portion.

In certain exemplary embodiments the separable shaft is attached to or formed integrally with a connection shaft at the radial inward portion, wherein the connection shaft extends along an axial direction of the gas turbine engine.

In certain exemplary embodiments the radial inward portion is located inward from the radial outward portion along the radial direction.

In certain exemplary embodiments the separable shaft includes a connection end located at a radially innermost end of the separable shaft, and wherein the connection end is coupled to a second portion of the tie shaft.

In certain exemplary embodiments the radial inward portion is located proximate the radially innermost end of the separable shaft.

In certain exemplary embodiments the radial outward portion of the separable shaft is separate and apart from the last rotor stage.

In certain exemplary embodiments the separable shaft defines a shaft length between the radial inward portion and the radial outward portion, and wherein the seal assembly is located at a portion of the separable shaft that is at least 80% of the shaft length away from the radial outward portion along the separable shaft towards the radial inward portion.

In certain exemplary embodiments the separable shaft defines an outward total surface area between the seal assembly and the radial outward portion and an inward total surface area between the seal assembly and the radial inward portion, and wherein the outward total surface area is greater than the inward total surface area.

In certain exemplary embodiments the gas turbine engine defines a high pressure cavity and a low pressure cavity, wherein the high pressure cavity and the low pressure cavity are each located aft of the separable shaft, wherein the outward total surface area is exposed to the high pressure cavity, and wherein the inward total surface area is exposed to the low pressure cavity.

In certain exemplary embodiments the interface between the radial outward portion of the separable shaft and the last rotor stage includes a friction fit.

In certain exemplary embodiments the gas turbine engine includes a turbine section assembled to a third portion of the tie shaft.

In another exemplary embodiment of the present disclosure, a separable shaft assembly for a gas turbine engine defining a radial direction and comprising a tie shaft and a compressor section assembled to a first portion of the tie shaft is provided. The separable shaft assembly includes a separable shaft having a radial outward portion and a radial inward portion, the radial outward portion of the separable shaft in contact with a portion of a last rotor stage at an interface when installed in the gas turbine engine; and a seal assembly operable with a portion of the separable shaft proximate the radial inward portion.

In certain exemplary embodiments the separable shaft is attached to or formed integrally with a connection shaft at the radial inward portion, wherein the connection shaft extends along an axial direction of the gas turbine engine.

In certain exemplary embodiments the radial inward portion is located inward from the radial outward portion along the radial direction.

In certain exemplary embodiments the separable shaft includes a connection end located at a radially innermost end of the separable shaft, and wherein the connection end is coupled to a second portion of the tie shaft.

In certain exemplary embodiments the radial inward portion is located proximate the radially innermost end of the separable shaft.

In certain exemplary embodiments the radial outward portion of the separable shaft is separate and apart from the last rotor stage.

In certain exemplary embodiments the separable shaft defines a shaft length between the radial inward portion and the radial outward portion, and wherein the seal assembly is located at a portion of the separable shaft that is at least 80% of the shaft length away from the radial outward portion along the separable shaft towards the radial inward portion.

In certain exemplary embodiments the separable shaft defines an outward total surface area between the seal assembly and the radial outward portion and an inward total surface area between the seal assembly and the radial inward portion, and wherein the outward total surface area is greater than the inward total surface area.

In certain exemplary embodiments the gas turbine engine defines a high pressure cavity and a low pressure cavity, wherein the high pressure cavity and the low pressure cavity are each located aft of the separable shaft, wherein the outward total surface area is exposed to the high pressure cavity, and wherein the inward total surface area is exposed to the low pressure cavity.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine, with forward referring to a position closer to an engine inlet and aft referring to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin. Here and throughout the specification and claims, range limitations are combined and interchanged, such ranges are identified and include all the sub-ranges contained therein unless context or language indicates otherwise.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

A seal assembly of the present disclosure is located at a portion of a separable shaft that is spaced away from a radial outward portion of the separable shaft. A seal assembly and seal arrangement of the present disclosure provides control to rotor thrust balance issues in tie shaft connection systems for a gas turbine engine. The seal configurations of the present disclosure may be more tolerant to engine mission point and long term seal wear thereby providing a more determinate, robust, repeatable rotor thrust balance system.

Conventional gas turbine engines using a tie shaft connection system place a seal assembly at the radial outward portion of the separable shaft. Such gas turbine engines may exhibit balance issues and large variations in rotor thrust balance. In such conventional systems, with the seal assembly located high at the radial outward portion of the separable shaft, anything radially downward from such a seal is at a lower pressure relative to, e.g., a compressor discharge pressure. Such relatively lower pressures on the separable shaft may not effectively push an entire rotor system forward, which may have an undesirable effect on an overall balance, e.g., rotor thrust balance, of the engine. These thrust balance problems may cause high vibration levels due to a bearing variable load.

In at least certain exemplary embodiments of the present disclosure, a seal assembly of the present disclosure is located at a portion of the separable shaft that is inward from the radial outward portion of the separable shaft, such as at least 80% of a shaft length SL away from the radial outward portion along the separable shaft towards the radial inward portion. With the seal assembly of the present disclosure operable with a portion of the separable shaft proximate the radial inward portion and located at a portion of the separable shaft that is spaced away from the radial outward portion of the separable shaft, a greater surface area SA1 of the separable shaft may be subjected to higher pressures of the gas turbine engine, e.g., of the compressor section, thereby potentially reducing rotor thrust variations and providing rotor thrust balance to the engine system.

In this manner, by moving the seal assembly radially downward as described in the present disclosure, the higher pressures that are being sealed act over a larger overall section, e.g., a larger surface area SA1 of the separable shaft, thereby providing a more determinate rotor thrust balance. This may also eliminate the fluctuations with the system which may cause vibration problems and eliminates back and forth sliding of certain components of the engine. Furthermore, a system of the present disclosure may enable a better design of a ball bearing portion to keep a steady load and to properly seat the ball bearing portion. For example, a system of the present disclosure may allow more pressure to act against the rotor system in a single direction, e.g., a forward direction, thereby making the ball bearing portion seat better.

Furthermore, a system of the present disclosure may enable a seal assembly and configuration that is more tolerant to engine mission point and long term seal wear thereby providing a more robust, repeatable rotor thrust balance.

Figure 1:
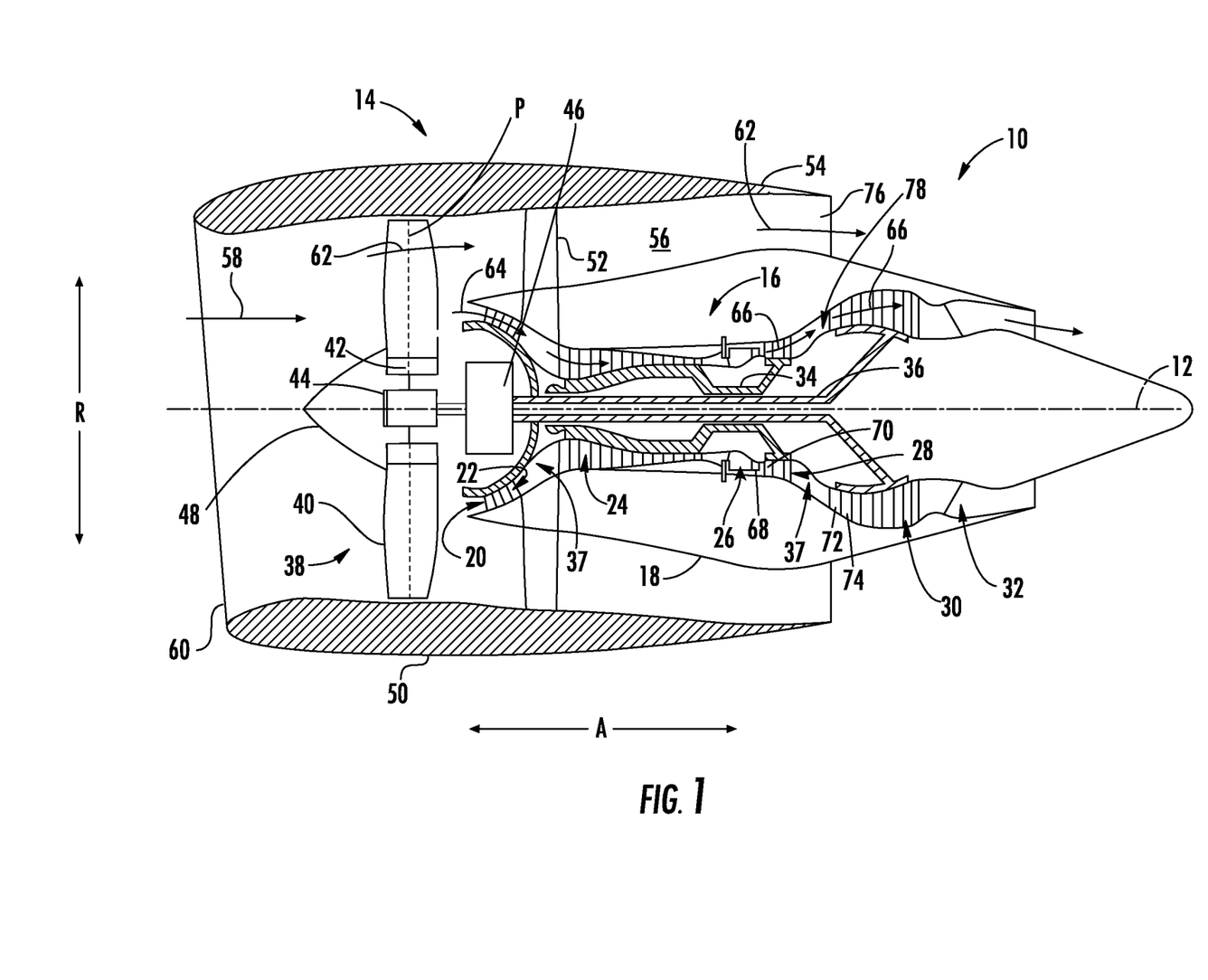
FIG. 1 is a schematic, cross-sectional view of an exemplary gas turbine engine in accordance with exemplary embodiments of the present disclosure.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. Additionally, the compressor section, combustion section 26, and turbine section together define at least in part a core air flowpath 37 extending therethrough. As described herein, a turbofan engine 10 of the present disclosure may include a tie shaft connection system.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachine 16. The nacelle 50 is, for the embodiment depicted, supported relative to the turbomachine 16 by a plurality of circumferentially-spaced outlet guide vanes 52. Additionally, a downstream section 54 of the nacelle 50 extends over an outer portion of the turbomachine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the turbofan engine 10 may be a direct drive turbofan engine (i.e., not including the power gearbox 46), may include a fixed pitch fan 38, etc. Additionally, or alternatively, aspects of the present disclosure may be incorporated into any other suitable gas turbine engine, such as a turboshaft engine, turboprop engine, turbojet engine, a land-based gas turbine engine for power generation, an aeroderivative gas turbine engine, etc.

Figure 2:
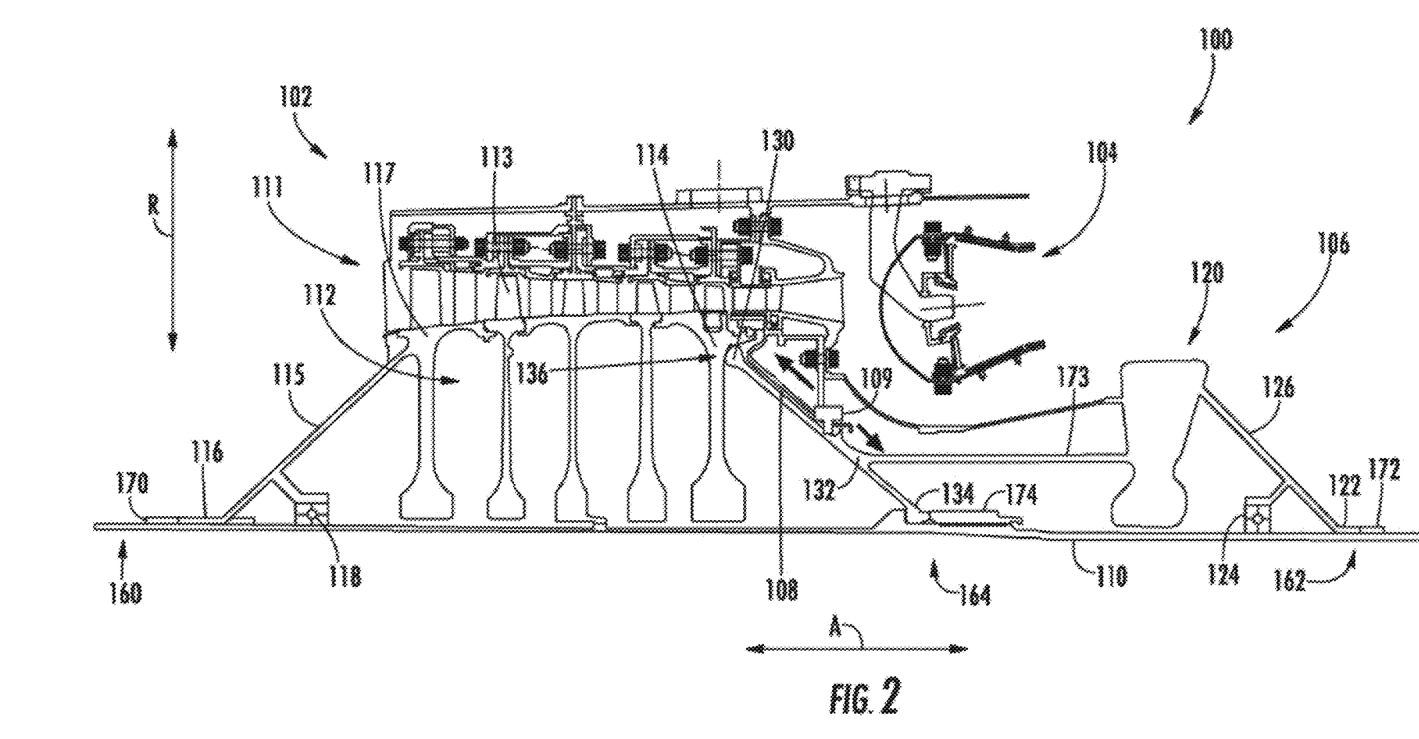
FIG. 2 is a schematic, cross-sectional view of a compressor section, a combustion section, a turbine section, a separable shaft, and a seal assembly in a tie shaft connection system in accordance with an exemplary embodiment of the present disclosure.

Referring now to FIG. 2, a schematic, cross-sectional view is provided of a portion of the compressor section 24, of the combustion section 26, and of the turbine section 28 of the exemplary turbofan engine 10 of FIG. 1. More specifically, FIG. 2 depicts a portion of a gas turbine engine 100 having a compressor section 102, a combustion section 104, a turbine section 106, a separable shaft 108, and a tie shaft 110. FIG. 2 illustrates an exemplary tie shaft connection system.

Some gas turbine engines are assembled with both compressor rotors and turbine rotors coupled to a tie shaft connection. This may eliminate one or more welded or bolted joints between such rotors and includes a single coupling using the tie shaft connection which applies an axial force through the compressor rotor stacks to couple them together. Such gas turbine engines may exhibit balance issues when there is large variations in rotor thrust balance Referring to FIG. 2, a gas turbine engine 100 is assembled with a compressor section 102, a turbine section 106, and a separable shaft 108, each assembled to a tie shaft 110 of a tie shaft connection system. The engine 100 defines an axial direction A and a radial direction R, and also includes a seal assembly 109 as described in more detail below.

In an exemplary embodiment of the present disclosure, the compressor section 102 includes a compressor 111 having plurality of stages, with each stage including a compressor rotor 112 and a plurality of compressor rotor blades 113 circumferentially arranged. The plurality of stages includes a last rotor stage 114, which is the downstream-most, or aft-most rotor stage in the embodiment depicted.

The compressor section 102 further includes a first abutment portion 116, and a forward or first bearing portion 118. The first abutment portion 116 is located at a forward end of the compressor 111 in the embodiment depicted. More specifically, for the embodiment shown, an extension member 115 is provided extending forward from a first rotor stage 117 of the compressor 111 (i.e., a forward-most/upstream-most stage of the plurality of stages of the compressor 111) to the first abutment portion 116 and first bearing portion 118. The first bearing portion 118 may be a ball or roller bearing.

In an exemplary embodiment of the present disclosure, the turbine section 106 further includes a turbine having one or more stages, with each stage including a turbine rotor 120. For the embodiment shown, a single turbine rotor 120 is illustrated for clarity without corresponding turbine rotor blades, etc. It will be appreciated, however, that in other embodiments, any other suitable number of stages of turbines may be provided.

The turbine section 106 additionally includes a second abutment portion 122. The second abutment portion 122 is located at an aft end of the turbine section 106 in the embodiment depicted. More specifically, for the embodiment shown, an extension member 126 is provided extending aft from a turbine rotor 120 of the turbine section 106 to the second abutment portion 122 and a rear or second bearing portion 124. The second bearing portion 124 may be a ball or roller bearing. In exemplary embodiments, the first bearing portion 118 may be a ball bearing and the second bearing portion 124 may be a roller bearing; or the first bearing portion 118 may be a roller bearing and the second bearing portion 124 may be a ball bearing; or any other suitable combination of bearings may be provided.

The compressor rotors 112 and the turbine rotors 120 are constrained to rotate together with the tie shaft 110. The first abutment portion 116 of the compressor section 102 assembles the compressor section 102 to a first or forward portion 160 of the tie shaft 110. In one embodiment, a fastener 170 is used to secure the first abutment portion 116 of the compressor section 102 to the first or forward portion 160 of the tie shaft 110.

The second abutment portion 122 of the turbine section 106 assembles the turbine section 106 to a second or rear portion 162 of the tie shaft 110. In one embodiment, a fastener 172 is used to secure the second abutment portion 122 of the turbine section 106 to the second or rear portion 162 of the tie shaft 110. It is contemplated that any suitable fastener or coupling mechanism can be used to secure the components of gas turbine engine 100 to the tie shaft 110. For example, the fasteners 170, 172 may be threaded fasteners, such as nuts, configured to rotatably engage with the tie shaft 110 through corresponding threaded sections. However, in other embodiments, any other suitable fasteners may be used.

Further, in an exemplary embodiment, a connection shaft 173 is included extending between a turbine of the turbine section 106 and the separable shaft 108. Specifically, for the embodiment depicted, the connection shaft 173 extends from the turbine rotor 120 of the turbine section 106 to the separable shaft 108. In the embodiment depicted in FIG. 2, the connection shaft 173 is formed integrally with the turbine rotor 120 and the separable shaft 108. However, in other embodiments, the connection shaft 173 may be formed separately and coupled in any suitable manner, such as through one or more bolts, splines, etc., or through a friction fit configuration. With such a configuration, the compressor rotors 112 and the turbine rotor(s) 120 are constrained to rotate together with the tie shaft 110. The tie shaft connection system shown in FIG. 2 may therefore eliminate one or more welded or bolted joint connections in other gas turbine engine systems with the coupling configuration depicted to the tie shaft 110 which applies an axial force through the compressor rotors 112 of the plurality of compressor stages of the compressor 111 and the turbine rotor(s) 120 of the turbine to hold them all together and create the friction necessary to transmit torque.

Figure 3:
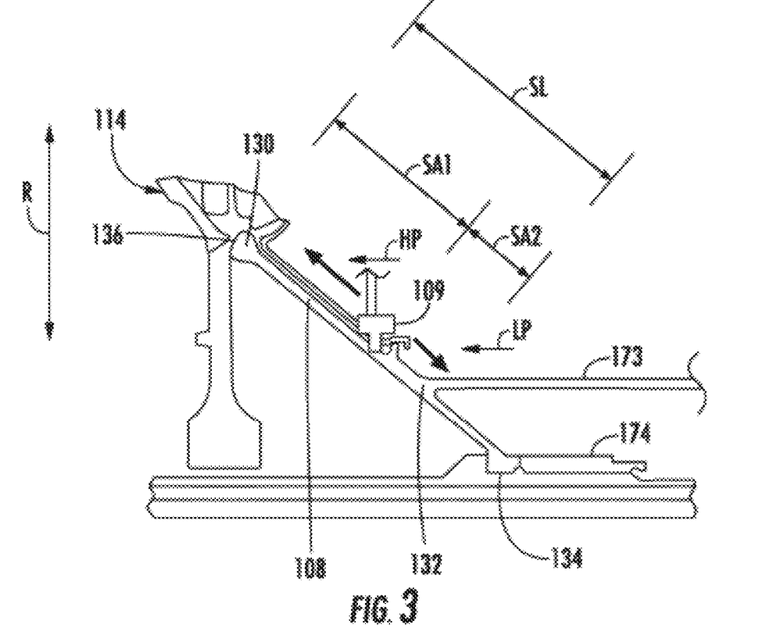
FIG. 3 is a schematic, cross-sectional view of a last rotor stage of a compressor section, a separable shaft, and a seal assembly in a tie shaft connection system in accordance with an exemplary embodiment of the present disclosure.
Figure 4:
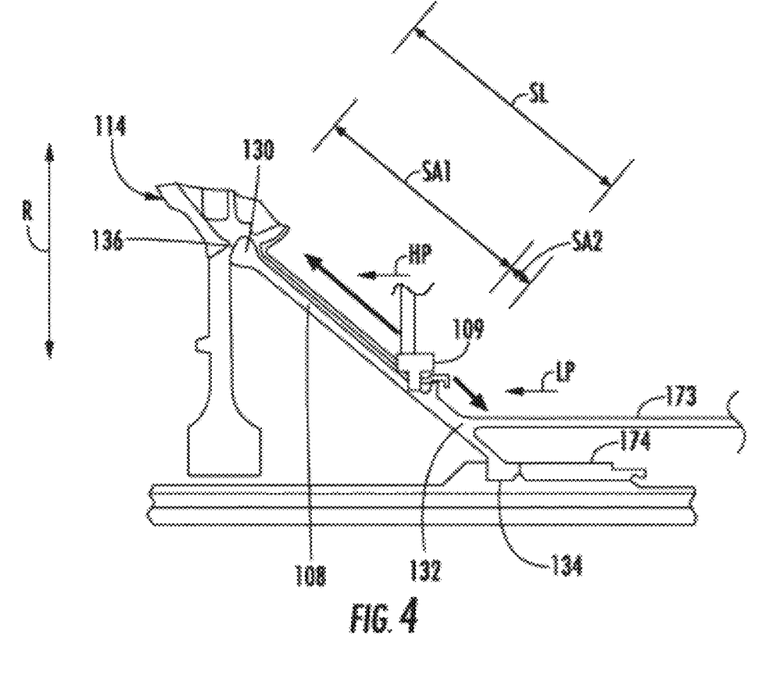
FIG. 4 is a schematic, cross-sectional view of a last rotor stage of a compressor section, a separable shaft, and a seal assembly in a tie shaft connection system in accordance with another exemplary embodiment of the present disclosure.

Referring to FIGS. 2-4, in exemplary embodiments of the present disclosure, the separable shaft 108 includes an interface end or radial outward portion 130, a radial inward portion 132, and a connection end 134. The separable shaft 108 is disposed between the compressor section 102 and the tie shaft 110, and the separable shaft 108 is disposed between the compressor section 102 and the turbine section 106. Specifically, for the embodiment shown, the connection shaft 173 is coupled to the separable shaft 108 at the radial inward portion 132, and extends generally along the axial direction A to the turbine section 106.

Notably, for the embodiment shown, the radial outward portion 130 is located at a radially outermost end of the separable shaft 108 and the connection end 134 is located at a radially innermost end of the separable shaft 108. The radial inward portion 132 is located proximate the radially innermost end of the separable shaft 108, i.e., closer to the radially innermost end than the radially outermost end.

The separable shaft 108 is used to provide support for the compressor rotors 112 of the compressor 111, which may be, e.g., a high pressure compressor (see FIG. 1), and provide control to the tie shaft 110. The connection end 134 of the separable shaft 108 assembles one end of the separable shaft 108 to a third or middle portion 164 of the tie shaft 110. In one embodiment, the connection end 134 of the separable shaft 108 is coupled to the third or middle portion 164 of the tie shaft 110 via a fastener 174. As discussed above, it is contemplated that any suitable fastener or coupling mechanism can be used to secure the separable shaft 108 or other components of gas turbine engine 100 to the tie shaft 110. For example, the fastener 174 may be a rotatable fastener configured to rotatably engage the middle portion 164 of the tie shaft 110.

This type of connection of the separable shaft 108 to the tie shaft 110 applies a preload that allows the compressor rotors 112 of the compressor 111, e.g., a high pressure compressor (see FIG. 1), to be installed separately from the turbine section 106, e.g., high pressure turbine rotors 120. The separable shaft 108 may control the dynamic stability of the engine systems spanning the distance between its forward and aft supports, e.g., the forward bearing portion 118 and the rear bearing portion 124.

Referring to FIGS. 2-4, the radial outward portion 130 of the separable shaft 108 is in contact with a portion of the last rotor stage 114 of the plurality of stages of the compressor 111 of the compressor section 102 at an interface 136 and the radial inward portion 132 is located inward from the radial outward portion 130. Specifically, for the embodiment shown, the radial inward portion 132 is spaced a distance away from the radial outward portion 130. In one embodiment, the interface 136 between the radial outward portion 130 of the separable shaft 108 and the last rotor stage 114 of the compressor section 102 includes a friction fit. Additionally, or alternatively, the interface 136 may include one or more features for assisting with the transmission of torque between the separable shaft 108 and the compressor 111. For example, the last rotor stage 114, the radial outward portion 130 of the separable shaft 108, or both, may include, e.g., nubs, teeth, splines, surface roughness, etc. to assist with the transmission of torque between the separable shaft 108 and the compressor 111.

The separable shaft defines a shaft length SL between the radial inward portion 132 and the radial outward portion 130. The separable shaft 108 also includes a connection end 134. As described above, for the embodiment shown, the radial outward portion 130 is located at a radially outermost end of the separable shaft 108 and the connection end 134 is located at a radially innermost end of the separable shaft 108. The radial inward portion 132 is located proximate the radially innermost end of the separable shaft 108, i.e., closer to the radially innermost end than the radially outermost end.

Referring still to FIGS. 2-4, the radial outward portion 130 of the separable shaft 108 is separate and apart from the last rotor stage 114 of the compressor section 102. As used herein, the term "separate and apart" with respect to the radial outward portion 130 of the separable shaft 108 being separate and apart from the last rotor stage 114 of the compressor section 102 refers to the radial outward portion 130 of the separable shaft 108 being in contact with a portion of the last rotor stage 114 at an interface 136, but not being formed integrally with a portion of the last rotor stage 114 or fixed to a portion of the last rotor stage 114 through an intermediated component (e.g., one or more bolts) or substance (e.g., glue, epoxy, etc.). This is an important distinction of a separable shaft 108 in a tie shaft connection system as shown in FIG. 2. In this manner, the radial outward portion 130 of the separable shaft 108 is distinguishable from a shaft that is formed integrally to the compressor section, e.g., a shaft in a gas turbine engine system having stages of the compressor section joined sequentially one to another into an inseparable assembly by welding or assembly by bolting using bolt flanges.

Referring to FIGS. 2-4, a seal assembly 109 is operable with a portion of the separable shaft 108 proximate the radial inward portion 132. A seal assembly 109 and seal arrangement of the present disclosure provides control to rotor thrust balance issues in tie shaft connection systems for a gas turbine engine 100. The seal configurations of the present disclosure may be more tolerant to engine mission point and long term seal wear thereby providing a more determinate, robust, repeatable rotor thrust balance system.

Conventional gas turbine engines using a tie shaft connection system place a seal assembly at the radial outward portion 130 of the separable shaft 108. Such gas turbine engines may exhibit balance issues and large variations in rotor thrust balance. In such conventional systems, with the seal assembly located radially high at the radial outward portion 130 of the separable shaft 108, more surface area of the separable shaft 108 is exposed to lower pressure air and the lower pressure air does not provide a desired amount of forward force on the separable shaft 108 to overcome the balance and vibration issues discussed herein.

Advantageously, referring to FIGS. 2 and 3, a seal assembly 109 of the present disclosure is located at a portion of the separable shaft 108 that is at least 80% of the shaft length SL away from the radial outward portion 130 along the separable shaft 108 towards the radial inward portion 132.

Referring to FIGS. 2-4, with the seal assembly 109 operable with a portion of the separable shaft 108 that is proximate the radial inward portion 132, a greater surface area SA1 of the separable shaft 108, i.e., the surface area SA1 of the separable shaft 108 between the radial outward portion 130 and the seal assembly 109, is subjected to higher pressures of the gas turbine engine 100, e.g., the compressor section 102, thereby reducing rotor thrust variations and providing rotor thrust balance to the engine system.

In this manner, by moving the seal assembly 109 radially downward as described in the present disclosure, the higher pressures that are being sealed act over a larger overall section, e.g., a larger surface area SA1 of the separable shaft 108, thereby providing a more determinate rotor thrust balance. This also eliminates the fluctuations with the system which cause vibration problems and eliminates back and forth sliding of the engine 100. Furthermore, a system of the present disclosure enables a better design of the first bearing portion 118 to keep a steady load and to properly seat the first bearing portion 118. For example, a system of the present disclosure allows more pressure to act against the rotor system in a single direction, e.g., a forward direction, thereby making the first bearing portion 118 seat better.

Referring to FIGS. 3 and 4, in exemplary embodiments, the separable shaft 108 defines an outward total surface area SA1 between the seal assembly 109 and the radial outward portion 130 and an inward total surface area SA2 between the seal assembly 109 and the radial inward portion 132, and wherein the outward total surface area SA1 is greater than the inward total surface area SA2.

Furthermore, referring to FIGS. 3 and 4, the gas turbine engine 100 defines a high pressure cavity where higher pressures HP are exerted and a low pressure cavity where lower pressures LP are exerted. In an exemplary embodiment, the high pressure cavity HP and the low pressure cavity LP are each located aft of the separable shaft. In this manner, the outward total surface area SA1 is exposed to the high pressure cavity and the higher pressures HP and the inward total surface area SA2 is exposed to the low pressure cavity and the lower pressures LP. The system of the present disclosure by lowering the seal assembly 109 to be operable with a portion of the separable shaft 108 proximate the radial inward portion 132 allows for more surface area of the separable shaft 108, e.g., outward total surface area SA1, to be exposed to the higher pressures HP of the gas turbine engine 100, e.g., the compressor section 102, thereby reducing rotor thrust variations and providing rotor thrust balance to the engine system.

It is contemplated that a seal assembly 109 of the present disclosure can be located at any portion of the separable shaft that is at least 80% of the shaft length SL away from the radial outward portion 130 along the separable shaft 108 towards the radial inward portion 132. In one embodiment of the present disclosure, a seal assembly 109 of the present disclosure is located at a portion of the separable shaft 108 that is at least 85% of the shaft length SL away from the radial outward portion 130 along the separable shaft 108 towards the radial inward portion 132.

In another embodiment of the present disclosure, referring to FIG. 4, a seal assembly 109 of the present disclosure is located at a portion of the separable shaft 108 that is at least 90% of the shaft length SL away from the radial outward portion 130 along the separable shaft 108 towards the radial inward portion 132.

In another embodiment of the present disclosure, a seal assembly 109 of the present disclosure is located at a portion of the separable shaft 108 that is at least 95% of the shaft length SL away from the radial outward portion 130 along the separable shaft 108 towards the radial inward portion 132.

In one exemplary embodiment, a seal assembly 109 of the present disclosure is a labyrinth seal. However, it is contemplated that other seals can be used with a system of the present disclosure. For example, a seal assembly 109 of the present disclosure can be a pad and blade seal, a brush seal, a similar seal, or any other seal mechanism. In one exemplary embodiment, the seal assembly 109 is integral to the separable shaft 108. In other exemplary embodiments, the seal assembly 109 is separate from the separable shaft 108 and is coupled to the separable shaft 108 via a bolt or other fastener.

The combustion section 104 is shown schematically in FIG. 2 and receives pressurized air therein, where it is mixed with fuel and burned to provide combustion gases 66. The combustion gases 66 are subsequently routed through the jet exhaust nozzle section 32 of the turbomachine 16 to provide propulsive thrust as described above with respect to FIG. 1.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A gas turbine engine defining a radial direction, the gas turbine engine comprising:
   a single shaft comprising a tie shaft;
   a compressor section including a last rotor stage, the compressor section assembled to a first portion of the tie shaft;
   a turbine section assembled to a third portion of the tie shaft;
   a first bearing portion disposed in an interface between the compressor section and the tie shaft nearer a forward portion of the compressor section than an aft portion of the compressor section;
   a second bearing portion disposed in an interface between the turbine section and the tie shaft nearer the aft portion of the compressor section than the forward portion of the compressor section;
   a separable shaft disposed between the compressor section and the tie shaft and assembled to a second portion of the tie shaft, the separable shaft having a radial outward portion and a radial inward portion, the radial outward portion of the separable shaft in contact with a portion of the last rotor stage at an interface; and
   a seal assembly operable with a portion of the separable shaft proximate the radial inward portion.

2. The gas turbine engine of claim 1, wherein the separable shaft is attached to or formed integrally with a connection shaft at the radial inward portion, wherein the connection shaft extends along an axial direction of the gas turbine engine.

3. The gas turbine engine of claim 1, wherein the radial inward portion is located inward from the radial outward portion along the radial direction.

4. The gas turbine engine of claim 1, wherein the separable shaft includes a connection end located at a radially innermost end of the separable shaft, and wherein the connection end is coupled to the second portion of the tie shaft.

5. The gas turbine engine of claim 4, wherein the radial inward portion is located proximate the radially innermost end of the separable shaft.

6. The gas turbine engine of claim 1, wherein the radial outward portion of the separable shaft is separate and apart from the last rotor stage.

7. The gas turbine engine of claim 1, wherein the separable shaft defines a shaft length between the radial inward portion and the radial outward portion, and wherein the seal assembly is located at a portion of the separable shaft that is at least 80% of the shaft length away from the radial outward portion along the separable shaft towards the radial inward portion.

8. The gas turbine engine of claim 1, wherein the separable shaft defines an outward total surface area between the seal assembly and the radial outward portion and an inward total surface area between the seal assembly and the radial inward portion, and wherein the outward total surface area is greater than the inward total surface area.

9. The gas turbine engine of claim 8, wherein the gas turbine engine defines a high pressure cavity and a low pressure cavity, wherein the high pressure cavity and the low pressure cavity are each located aft of the separable shaft, wherein the outward total surface area is exposed to the high pressure cavity, and wherein the inward total surface area is exposed to the low pressure cavity.

10. The gas turbine engine of claim 1, wherein the interface between the radial outward portion of the separable shaft and the last rotor stage includes a friction fit.

11. The gas turbine engine of claim 1, wherein the last rotor stage is rotatably attached to the first portion of the tie shaft.

12. A separable shaft assembly for a gas turbine engine defining a radial direction and comprising a tie shaft and a compressor section assembled to a first portion of the tie shaft with a first bearing portion disposed between the compressor section and the tie shaft nearer a forward portion of the compressor section than an aft portion of the compressor section and a second bearing portion disposed between the turbine section and the tie shaft nearer the aft portion of the compressor section than the forward portion of the compressor section, the separable shaft assembly comprising:
a separable shaft having a radial outward portion and a radial inward portion, the radial outward portion of the separable shaft in contact with a portion of a last rotor stage at an interface when installed in the gas turbine engine and the radial inward portion extending toward a second portion of the tie shaft between the first bearing portion and the second bearing portion; and
a seal assembly operable with a portion of the separable shaft proximate the radial inward portion; and
wherein the tie shaft comprises a third portion that assembled to a turbine section of the gas turbine engine when installed in the gas turbine engine.

13. The separable shaft assembly of claim 12, wherein the separable shaft is attached to or formed integrally with a connection shaft at the radial inward portion, wherein the connection shaft extends along an axial direction of the gas turbine engine.

14. The separable shaft assembly of claim 12, wherein the radial inward portion is located inward from the radial outward portion along the radial direction.

15. The separable shaft assembly of claim 12, wherein the separable shaft includes a connection end located at a radially innermost end of the separable shaft, and wherein the connection end is coupled to the second portion of the tie shaft.

16. The separable shaft assembly of claim 15, wherein the radial inward portion is located proximate the radially innermost end of the separable shaft.

17. The separable shaft assembly of claim 12, wherein the radial outward portion of the separable shaft is separate and apart from the last rotor stage.

18. The separable shaft assembly of claim 12, wherein the separable shaft defines a shaft length between the radial inward portion and the radial outward portion, and wherein the seal assembly is located at a portion of the separable shaft that is at least 80% of the shaft length away from the radial outward portion along the separable shaft towards the radial inward portion.

19. The separable shaft assembly of claim 12, wherein the separable shaft defines an outward total surface area between the seal assembly and the radial outward portion and an inward total surface area between the seal assembly and the radial inward portion, and wherein the outward total surface area is greater than the inward total surface area.

20. The separable shaft assembly of claim 19, wherein the gas turbine engine defines a high pressure cavity and a low pressure cavity, wherein the high pressure cavity and the low pressure cavity are each located aft of the separable shaft, wherein the outward total surface area is exposed to the high pressure cavity, and wherein the inward total surface area is exposed to the low pressure cavity.

* * * * *